United States Patent
Lu et al.

(10) Patent No.: US 11,475,424 B2
(45) Date of Patent: Oct. 18, 2022

(54) METHOD AND SYSTEM FOR IMPLEMENTING INTERWORKING OF DIFFERENT PAYMENT OPERATIONS

(71) Applicant: Alipay (Hangzhou) Information Technology Co., Ltd., Zhejiang (CN)

(72) Inventors: Kaihua Lu, Zhejiang (CN); Wei Huang, Zhejiang (CN)

(73) Assignee: Alipay (Hangzhou) Information Technology Co., Ltd., Hangzhou (CN)

(*) Notice: Subject to any disclaimer, the term of this patent is extended or adjusted under 35 U.S.C. 154(b) by 0 days.

(21) Appl. No.: 17/362,753

(22) Filed: Jun. 29, 2021

(65) Prior Publication Data

US 2022/0036329 A1 Feb. 3, 2022

(30) Foreign Application Priority Data

Aug. 3, 2020 (CN) .......................... 202010768916.7

(51) Int. Cl.
| G06Q 20/14 | (2012.01) |
| G06Q 20/40 | (2012.01) |
| G06Q 50/30 | (2012.01) |
| G07B 15/02 | (2011.01) |

(52) U.S. Cl.
CPC ..... G06Q 20/145 (2013.01); G06Q 20/40145 (2013.01); G06Q 50/30 (2013.01); G07B 15/02 (2013.01); G06Q 2240/00 (2013.01)

(58) Field of Classification Search
CPC .......... G06Q 20/145; G06Q 50/30; G06Q 20/40145; G07B 15/02
USPC ........................................................ 705/13
See application file for complete search history.

(56) References Cited

U.S. PATENT DOCUMENTS

| 2003/0009420 A1 | 1/2003 | Jones | |
| 2011/0302081 A1* | 12/2011 | Saunders | G07B 15/04 705/39 |
| 2012/0158467 A1* | 6/2012 | Hammad | G07F 7/1008 705/13 |
| 2013/0256403 A1* | 10/2013 | Mackinnon Keith | G06Q 30/0637 235/375 |
| 2014/0056526 A1 | 2/2014 | Scipioni | |
| 2016/0042485 A1* | 2/2016 | Kopel | G06Q 20/321 705/13 |

(Continued)

FOREIGN PATENT DOCUMENTS

| CN | 111160918 A | 5/2020 |
| CN | 111311227 A * | 6/2020 |

OTHER PUBLICATIONS

Burt, Chris; "Georgia completes trial of face biometric payments for subway system ahead of Japan"; Dec. 18, 2019. (Year: 2019).*

*Primary Examiner* — Resha Desai
*Assistant Examiner* — Dione N. Simpson
(74) *Attorney, Agent, or Firm* — Seed IP Law Group LLP

(57) ABSTRACT

The present specification discloses a method and system for implementing interworking of different payment operations. On a basis of determining a payment link by an entry passing operation, related data generated by a first exit payment operation belonging to a different type from the entry passing operation is superimposed on the payment link, fee deduction information is further determined, and the fee deduction information corresponding to the first exit payment operation is transmitted, by using the payment link, to a third-party payment system for exit fee deduction.

18 Claims, 3 Drawing Sheets

(56) References Cited

U.S. PATENT DOCUMENTS

2017/0329777 A1* 11/2017 Vlugt ..................... G07C 9/257
2018/0211188 A1* 7/2018 Bergdale .................. G07G 1/14
2019/0206158 A1* 7/2019 Xu ....................... G06V 40/172

* cited by examiner

METHOD AND SYSTEM FOR IMPLEMENTING INTERWORKING OF DIFFERENT PAYMENT OPERATIONS

BACKGROUND

Technical Field

The present specification relates to the field of electronic payment, and in particular, to a method and system for implementing interworking of different payment operations.

Description of the Related Art

At present, with the development of the Internet, more vehicles also support on-line transactions. For example, when people got on or off vehicles such as original buses and subways, or people got in or out of stations, fee deduction could be implemented only by using physical cards. However, current vehicles, such as buses and subways, are already capable of supporting a wide variety of fee deduction modes to implement payment. For example, quick response code payment and face-scanning payment. Therefore, there are more research topics for payment modes.

BRIEF SUMMARY

Implementations of the present specification provide a method and system for implementing interworking of different payment operations.

According to a first aspect, an implementation of the present specification provides a method for implementing interworking of different payment operations. The method includes: receiving, by using a payment link corresponding to an entry passing operation, related data generated by a first exit payment operation, the entry passing operation and the first exit payment operation forming a same journey and corresponding to different types of payment operations; determining fee deduction information corresponding to the first exit payment operation based on the related data of the first exit payment operation; and transmitting, by using the payment link, the fee deduction information corresponding to the first exit payment operation to a third-party payment system for exit fee deduction.

According to a second aspect, an implementation of the present specification provides a method for implementing interworking of different payment operations. The method includes: receiving fee deduction information corresponding to a first exit payment operation by using a payment link corresponding to an entry passing operation, the entry passing operation and the first exit payment operation forming a same journey and corresponding to different types of payment operations, and after a traffic management system receives, by using the payment link, related data generated by the first exit payment operation, the fee deduction information corresponding to the first exit payment operation being determined based on the related data; and performing fee deduction based on the fee deduction information corresponding to the first exit payment operation.

According to a third aspect, an implementation of the present specification provides a traffic management system. The system includes: a first receiving module, configured to receive, by using a payment link corresponding to an entry passing operation, related data generated by a first exit payment operation, the entry passing operation and the first exit payment operation forming a same journey and corresponding to different types of payment operations; a first determining module, configured to determine fee deduction information corresponding to the first exit payment operation based on the related data of the first exit payment operation; and a first transmission module, configured to transmit, by using the payment link, the fee deduction information corresponding to the first exit payment operation to a third-party payment system for exit fee deduction.

According to a fourth aspect, an implementation of the present specification provides a third-party payment system. The system includes: a receiving unit, configured to receive fee deduction information corresponding to a first exit payment operation by using a payment link corresponding to an entry passing operation, the entry passing operation and the first exit payment operation forming a same journey and corresponding to different types of payment operations, and after a traffic management system receives, by using the payment link, related data generated by the first exit payment operation, the fee deduction information corresponding to the first exit payment operation being determined based on the related data; and a fee deduction unit, configured to perform fee deduction based on the fee deduction information corresponding to the first exit payment operation.

According to a fifth aspect, a system for implementing interworking of different payment operations is provided. The system includes: an exit gate, a traffic management system, and a third-party payment system.

The exit gate is configured to obtain related data generated by a first exit payment operation.

The traffic management system is configured to: receive, by using a payment link corresponding to an entry passing operation, the related data generated by the first exit payment operation; determine fee deduction information corresponding to the first exit payment operation based on the related data of the first exit payment operation; and transmit, by using the payment link, the fee deduction information corresponding to the first exit payment operation to the third-party payment system, the entry passing operation and the first exit payment operation forming a same journey and corresponding to different types of payment operations.

The third-party payment system is configured to perform a fee deduction operation based on the fee deduction information corresponding to the first exit payment operation.

According to a sixth aspect, an implementation of the present specification provides a computer-readable storage medium storing a computer program. The steps of the above method are implemented when the program is executed by a processor.

According to a seventh aspect, an implementation of the present specification provides a computer device. The computer device includes a memory, a processor, and a computer program stored in the memory and executable on the processor. The steps of the above method are implemented when the processor executes the program. One or more of the above technical solutions in the implementations of the present specification at least have the following technical effects:

According to the method for implementing interworking of different payment operations of the present specification, on a basis of determining the payment link by the entry passing operation, the related data generated by the first exit payment operation belonging to the different type from the entry passing operation is superimposed on the payment link, the fee deduction information is further determined, and the fee deduction information corresponding to the first exit payment operation is transmitted, by using the payment link, to the third-party payment system for the exit fee deduction. It can be seen that, in the present specification, on a basis of not changing an original payment link determined by the entry passing operation, data generated by an exit payment operation of another type can be superimposed, so that interworking of different payment operations can be implemented without changing a payment link determined by an original traveling mode.

BRIEF DESCRIPTION OF THE SEVERAL VIEWS OF THE DRAWINGS

To describe the technical solutions in the implementations of the present specification clearly, the following is a brief introduction of the accompanying drawings for illustrating such technical solutions. Clearly, the accompanying drawings described below are some implementations of the present specification, and a person skilled in the art can derive other drawings from such accompanying drawings without making innovative efforts.

DETAILED DESCRIPTION

Figure 1:
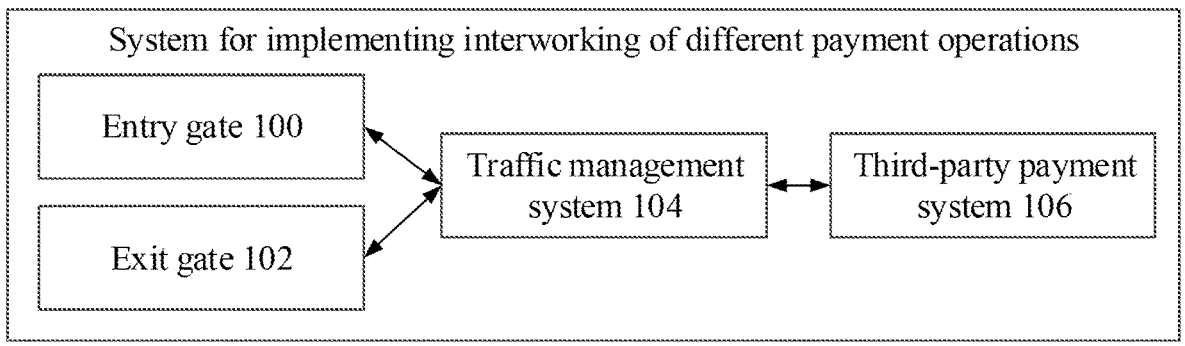
FIG. 1 is a schematic diagram illustrating a system for implementing interworking of different payment operations according to an implementation of the present specification.

To make the objectives, technical solutions, and advantages of the implementations of the present specification clearer, the following clearly and completely describes the technical solutions in the implementations of the present specification with reference to the accompanying drawings in the implementations of the present specification. Clearly, the described implementations are some but not all of the implementations of the present specification. All other implementations obtained by a person skilled in the art based on the implementations of the present specification without making innovative efforts shall fall within the protection scope of the present specification.

Agreement withholding refers to a fee deduction service provided to a client, based on a fee deduction instruction initiated by the client, by a third-party payment institution matched for the client by a depository bank based on entrustment of the client.

Quick response code is two-dimensional code that can be used to take transportation and is applicable to a plurality of traffic scenarios.

One or more implementations of the present specification disclose a method and system for implementing interworking of different payment operations. The system can be applied to various traffic scenarios, such as a subway. References can be made to FIG. 1, the system includes: an entry gate 100, an exit gate 102, a traffic management system 104, and a third-party payment system 106. The entry gate 100 and the exit gate 102 are configured to perform gate passing detection for a user, and collect data generated in response to that the user passes a gate. For example, journey data and a code value can be collected in response to that a user uses quick response code to pass a gate. Journey data, facial feature data, and the like can be collected in response to that a user passes a gate by face-scanning. The traffic management system 104 is used to comprehensively manage and process data generated by entering a gate and exiting a gate, thereby generating fee deduction information. The traffic management system 104 can automatically perform fee deduction. For example, the system can automatically deduct balance in a subway pass in response to that the subway pass is used to pass a gate. Certainly, the data can be transmitted to the third-party payment system 106 for fee deduction. For example, the traffic management system 104 and the third-party payment system 106 sign an agreement for withholding, and the third-party payment system 106 provides an agreement withholding service based on the fee deduction information generated by the traffic management system 104.

Although there are many payment methods at present, payment methods at an entry gate and an exit gate at present need to be the same and cannot be used in a mixed way. For example, in response to entering a subway station, a user can pass a gate by face-scanning or using quick response code arbitrarily. However, in response to leaving the subway station, the user can leave the subway station only by using a payment method the same as the method used for entering. It is assumed that the user selects the quick response code to enter the subway station, the user needs to leave the station also by using the quick response code for fee deduction, but cannot use face-scanning payment.

In one or more implementations of the present specification, on a basis of determining a payment link by an entry passing operation, related data generated by a first exit payment operation belonging to a different type from the entry passing operation is superimposed on the payment link, fee deduction information is further determined, and the fee deduction information corresponding to the first exit payment operation is transmitted, by using the payment link, to the third-party payment system 106 for exit fee deduction. It can be seen that, in the present specification, on a basis of not changing an original payment link determined by the entry passing operation, data generated by an exit payment operation of another type can be superimposed, so that interworking of different payment operations can be implemented without changing a payment link determined by an original traveling mode.

Figure 2:
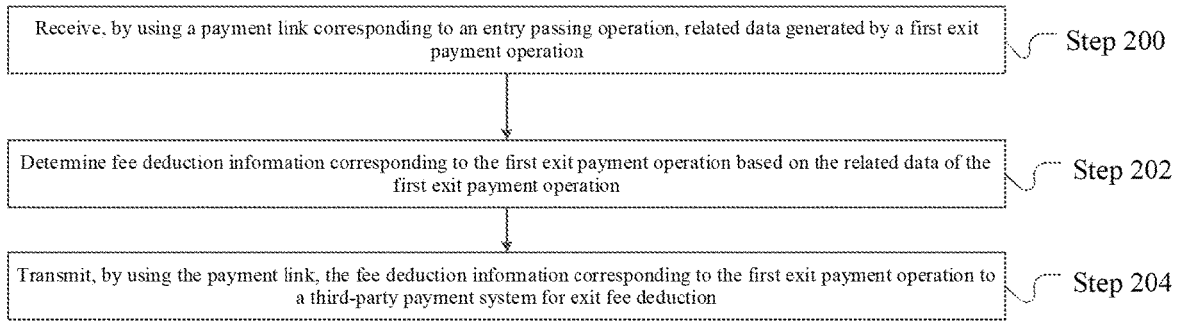
FIG. 2 is a flowchart illustrating a method for implementing interworking of different payment operations according to an implementation of the present specification.

References can be made to FIG. 2, one or more implementations of the present specification describe a method for implementing interworking of different payment operations from the traffic management system 104 side. The method, for example, includes the following steps:

Step 200. Receive, by using a payment link corresponding to an entry passing operation, related data generated by a first exit payment operation. In the implementation, the entry passing operation includes a quick response code recognition operation, for example, a quick response code-scanning operation, and a biometric feature recognition operation, for example, a face-scanning operation or a fingerprint-scanning operation The first exit payment operation includes: a quick response code recognition operation, for example, a quick response code-scanning operation, and a biometric feature recognition operation, for example, a face-scanning operation or a fingerprint-scanning operation.

The second exit payment operation includes: a quick response code recognition operation, for example, a quick response code-scanning operation, and a biometric feature recognition operation, for example, a face-scanning operation or a fingerprint-scanning operation.

The entry passing operation and the first exit payment operation form a same journey and correspond to different types of payment operations. The entry passing operation and the second exit payment operation correspond to a same type of payment operation.

The payment link corresponding to the entry passing operation refers to a link used to transmit fee deduction information for payment. Generally, an entry passing operation determines a corresponding payment link, and corresponding fee deduction information is transmitted by using the payment link in response to that a second exit payment operation is generated. However, in the implementations, fee deduction information of the first exit payment operation constructing a same journey and belonging to a passing operation of a different type can be transmitted by using the payment link.

For example, it is assumed that a user takes a subway at station A and exits at station B. The user performs quick response code-scanning to enter a gate at station A, based on conventional payment logic, the user determines to use quick response code for payment because a quick response code-scanning operation is performed when the user enters a gate, thus the user needs to perform quick response code-scanning for payment to exit a gate at station B. As such, an operation generated in response to that the user enters the gate is an entry passing operation, an operation generated in response to that the user exits the gate is a second exit payment operation, and the two operations constitute a journey from station A to station B. The above example is the existing conventional payment logic for entering and exiting gates. However, in the implementations, because mixed application of different payment passing ways can be supported, the user can perform face-scanning payment when exiting the gate at station B. In the implementations, quick response code-scanning entry (an entry passing operation) and face-scanning exit (a first exit payment operation), namely passing operations of two different types, constitute a journey from station A to station B.

The entry passing operation determines respective data processing ways of the gates, the traffic management system 140, and the third-party payment system 106, a data interaction mode between the gates, the traffic management system 140, and the third-party payment system 106, a used payment link, and a data interface of the payment link. For example, it is assumed that the entry passing operation is a quick response code recognition operation, a payment link determined by the quick response code recognition operation is a data interface corresponding to a quick response code payment link.

In an implementation, before the receiving, by using the payment link corresponding to the entry passing operation, the related data generated by the first exit payment operation, a specific payment link is determined for use in subsequent data transmission. It should be noted that different payment links correspond to different data interfaces, so as to receive respective data. For example, in response to that the entry passing operation is a quick response code recognition operation and the first exit payment operation is a biometric feature recognition operation, a quick response code payment link is determined as a payment link corresponding to the entry passing operation based on the quick response code recognition operation. Similarly, in response to that the entry passing operation is a biometric feature recognition operation and the first exit payment operation is a quick response code recognition operation, a biometric feature payment link is determined as a payment link corresponding to the entry passing operation based on the biometric feature recognition operation, and data is received by using a data interface corresponding to the biometric feature payment link.

For example, the quick response code payment link and the biometric feature payment link belong to different product links and have different data interfaces.

For example, the payment link in the implementations includes two sub-links: The first sub-link is from the exit gate 102 to the traffic management system 104, and the second sub-link is from the traffic management system 104 to the third-party payment system 106.

The first sub-link transmits original recognition data to the traffic management system 104 intact after the exit gate 102 recognizes a face or quick response code, conversion from the face to withholding agreement code or quick response code parsing is completed in the traffic management system 104, and obtained data is transmitted by using the second sub-link. Because different payment links determine different data interfaces for data transmission, in the implementations, on a basis of not changing an original payment link determined by the entry passing operation, different data is transmitted back to the traffic management system 104 by using a data interface determined by the entry passing operation. It can be seen that, based on a data transmission fee deduction way of an original type, data generated by an exit payment operation of another type is superposed for fee deduction, so that interworking of different payment operations can be implemented without changing a payment link determined by an original traveling mode.

Using a quick response code payment link as an example, in response to that a user performs a quick response code-scanning entry passing operation, an original exit payment operation is quick response code-scanning entry, that is, the exit gate 102 transmits quick response code-related data (for example, a quick response code value and journey data) to the traffic management system 104 by using the quick response code payment link, the quick response code value and the journey data are received by using a data interface for quick response code, the quick response code value and the journey data are given to the third-party payment system 106 by using the quick response code payment link, the code value includes user fee deduction account information, the journey data includes a fee deduction amount, and the third-party payment system 106 performs fee deduction directly based on the code value and the journey data.

In response to the quick response code-scanning entry and face-scanning exit in this case, on a basis of not changing a quick response code payment link determined by an original face-scanning entry passing operation, face data is transmitted to the traffic management system 104, the conversion from a face to withholding agreement code is completed in the traffic management system 104, and the withholding agreement code and journey data are received by using a data interface for quick response code and then are transmitted back to the third-party payment system 106. The two sub-links are original quick response code data backflow links, and implement face recognition and quick response code fee deduction without using a new data interface after face recognition scenario-related data is compatible.

For example, in the implementations, because a quick response code value and withholding agreement code in quick response code data are issued by a same system, for example, issued by the third-party payment system 106, interworking of different payment operations can be implemented only by adding a field without using a new data synchronization interface. Therefore, during data transmission, using a data interface of a quick response code payment link as an example, a journey and a code value in original received quick response code, a face does not have code value but has journey data, the face is converted into user fee deduction account information and withholding agreement code corresponding to the user fee deduction account information is identified, and the withholding agreement code is transmitted by using the quick response code data transmission interface, thus the original data link that has only the code value supports face-scanning data.

Certainly, using a face-scanning payment link as an example, in response to that a user performs a face-scanning entry passing operation and quick response code-scanning exit passing, quick response code-related data (for example, a quick response code value and journey data) can be received by using a data interface of the face-scanning payment link, the quick response code-related data is given to the third-party payment system 106 by using the face-scanning payment link, and the third-party payment system 106 performs fee deduction based on withholding agreement code and the journey data.

It can be seen that the above two payment methods are actually two sets of payment logic. In the implementations, in response to that an entry passing operation determines a payment link, a corresponding interface of the payment link can receive and implement different payment logic. Regardless of whether an operation type of an exit payment operation is the same as that of an entry passing operation, related data needs to be transmitted by using a payment link determined by the entry passing operation and an interface corresponding to the payment link. It can be seen that, in the implementations, compatible transmission of data in different payment logic is not based on the data itself, but based on a payment link and a corresponding interface of the payment link, so as to implement interworking of different payment operations.

In the implementations, different first exit payment operations generate different related data. For example, in response to that the first exit payment operation is a quick response code-scanning operation, related data generated by the quick response code-scanning operation includes journey data and a quick response code value. Similarly, in response to that the first exit payment operation is a biometric feature recognition operation, related data generated by the biometric feature recognition operation includes biometric feature data and journey data, such as face data and fingerprint data. Further, in response to that the entry passing operation is a quick response code recognition operation and the first exit payment operation is a biometric feature recognition operation, in a process of receiving, by using the payment link corresponding to the entry passing operation, the related data generated by the first exit payment operation, biometric feature data generated by the biometric feature recognition operation is received by using the quick response code payment link. Similarly, in response to that the entry passing operation is a biometric feature recognition operation and the first exit payment operation is a quick response code recognition operation, quick response code data generated by the quick response code recognition operation is received by using the biometric feature payment link.

In the implementations, after collecting related data generated by the first exit payment operation, the exit gate 102 transmits the related data to the traffic management system 104 by using the payment link determined by the entry passing operation, and the traffic management system 104 can receive the related data and perform subsequent processing.

Step 202. Determine fee deduction information corresponding to the first exit payment operation based on the related data of the first exit payment operation.

The fee deduction information includes withholding agreement code used for deduction, quick response code data, and the like.

The fee deduction information is determined by an exit payment operation and related data of the exit payment operation. In response to that the first exit payment operation is a biometric feature recognition operation, determined fee deduction information is actually withholding agreement code. For example, corresponding to the traffic management system 104, each user has withholding agreement code, and the code is unique. The withholding agreement code is used to distinguish code of each user from code of other users. The withholding agreement code is agreed upon by the traffic management system 104 and the third-party payment system 106, and can be generated by the traffic management system 104 or the third-party payment system 106 as a basis for fee deduction.

Further, in the implementations, in a process of determining withholding fee information, user fee deduction account information is determined based on the related data of the first exit payment operation, and withholding agreement code corresponding to the first exit payment operation is determined based on the user fee deduction account information. Because the user fee deduction account information is unique and is obtained after registration, user fee deduction account information of each user matches withholding agreement code of the user. As such, corresponding withholding agreement code can be obtained based on the user fee deduction account information. The user fee deduction account information can be generated by the traffic management system 104 or the third-party payment system 106.

In response to that the withholding agreement code and the user fee deduction account information are generated by the third-party payment system 106, the withholding agreement code and the user fee deduction account information can be sent to the traffic management system 104 in advance for storage and subsequent use.

In an implementation, in response to that the first exit payment operation is a quick response code recognition operation, the related data generated by the first exit payment operation is a quick response code value and journey data. The payment link at this time is a biometric feature payment link. Further, quick response code data generated by the quick response code recognition operation can be received by using the biometric feature payment link.

Further, the quick response code value and the journey data can be directly used as the fee deduction information for fee deduction.

Step 204. Transmit, by using the payment link, the fee deduction information corresponding to the first exit payment operation to a third-party payment system for exit fee deduction.

For example, in response to a fee deduction success, the third-party payment system 106 synchronizes a result indicating the fee deduction success to a subway management system, and the subway management system controls the exit gate 102 to open for a user to pass.

It can be seen that, in the implementations, fee deduction information corresponding to first exit passing operations of different types can be transmitted, by using a payment link determined by an entry passing operation, to the third-party payment system 106 for exit fee deduction, so as to implement interworking of different payment operations.

In response to a fee deduction failure, an original exit passing operation can be replaced for payment and exit. For example, related data generated by a second exit payment operation is received by using the payment link. Fee deduction information corresponding to the second exit payment operation is determined based on the related data of the second exit payment operation. The fee deduction information corresponding to the second exit payment operation is transmitted, by using the payment link, to the third-party payment system 106 for exit fee deduction.

The second exit payment operation is determined by the entry passing operation. For example, in response to that the entry passing operation is a quick response code-scanning operation, the second exit payment operation is also a quick response code-scanning operation.

Different second exit payment operations generate different related data. For example, in response to that the second exit payment operation is a quick response code-scanning operation, related data generated by the quick response code-scanning operation is journey data and a quick response code value. Similarly, in response to that the second exit payment operation is a biometric feature recognition operation, related data generated by the biometric feature recognition operation is biometric feature data and journey data, such as face data and fingerprint data.

Further, in a process of determining fee deduction information, different second exit payment operations also determine different fee deduction information. For specific fee deduction information and a determining method of the specific fee deduction information, reference can be made to the above implementations, and details are omitted in the present application.

The above is the method described from the traffic management system 104 side. The following implementations describe a specific implementation process from the third-party payment system 106 side. The implementations in the present specification are described in a progressive way. For same or similar parts of the implementations, mutual references can be made to the implementations. Each implementation focuses on a difference from other implementations.

In the implementations, a method for implementing interworking of different payment operations is described from the third-party payment system 106 side. The method includes: receiving fee deduction information corresponding to a first exit payment operation by using a payment link corresponding to an entry passing operation; and performing fee deduction based on the fee deduction information corresponding to the first exit payment operation.

The entry passing operation and the first exit payment operation form a same journey and correspond to different types of payment operations. After the traffic management system 104 receives, by using the payment link, related data generated by the first exit payment operation, the fee deduction information corresponding to the first exit payment operation is determined based on the related data.

In an implementation, after the fee deduction is performed based on withholding agreement code, in response to a fee deduction success, the third-party payment system 106 synchronizes a result indicating the fee deduction success to a subway management system, and the subway management system controls the exit gate 102 to open for a user to pass. In response to a fee deduction failure, fee deduction is performed by receiving fee deduction information corresponding to a second exit payment operation by using the payment link, the entry passing operation and the second exit payment operation correspond to a same type of payment operation, and after the traffic management system 104 receives, by using the payment link, related data generated by the second exit payment operation, the fee deduction information corresponding to the second exit payment operation is determined based on the related data of the second exit payment operation.

The above describes the method for implementing interworking of different payment operations in the implementations from a traffic system side and the third-party payment system 106 side, the following uses a specific example for description.

Figure 3:
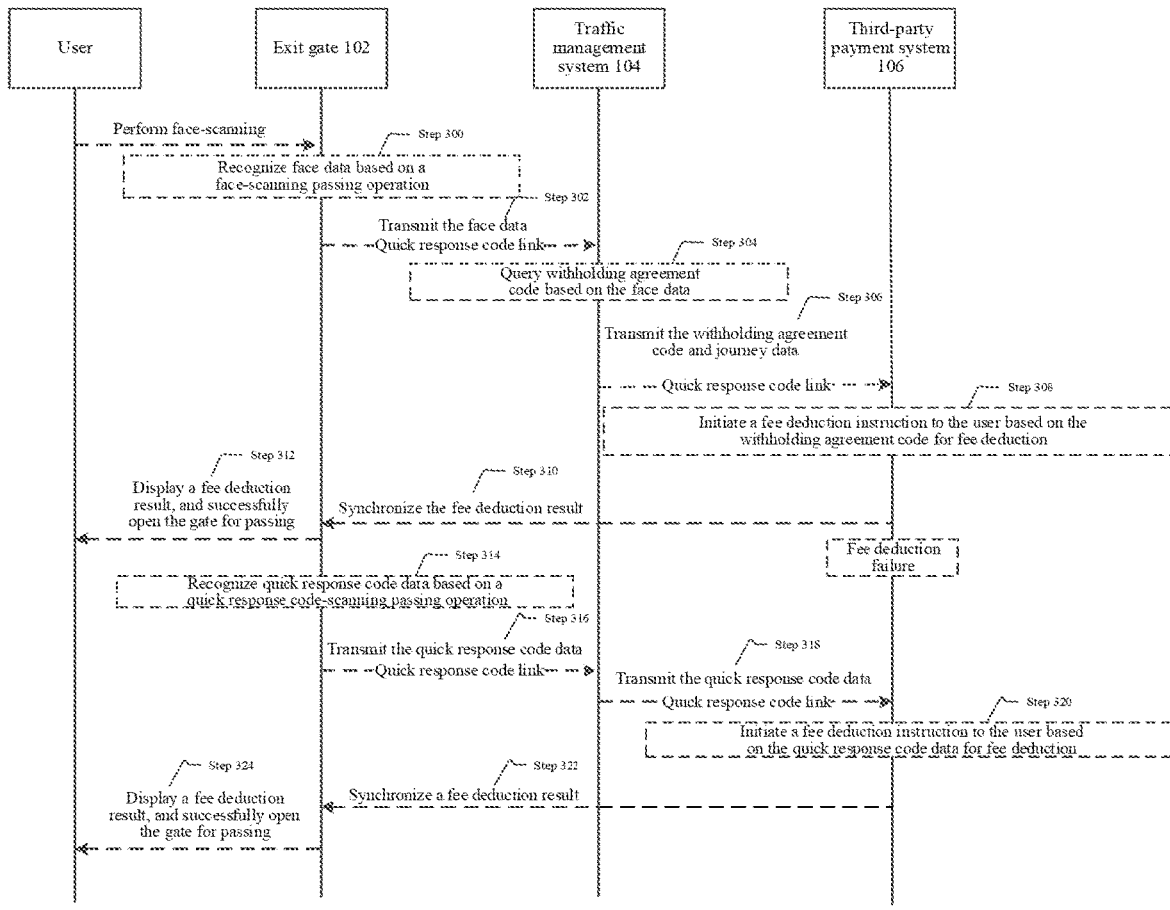
FIG. 3 is a schematic diagram illustrating implementation of quick response code-scanning entry and face-scanning exit according to an implementation of the present specification.

In response to that a user enters a gate, a quick response code-scanning entry passing operation is used, thus a payment link determined by the quick response code-scanning entry passing operation is a quick response code payment link. For a face-scanning exit passing operation performed in response to that the user exits a gate, references can be made to FIG. 3, and the present example has the following interaction method:

Step 300. The exit gate 102 recognizes face data based on a face-scanning passing operation.

Step 302. The exit gate 102 transmits the face data to the traffic management system 104 by using the quick response code payment link.

Step 304. The traffic management system 104 queries withholding agreement code based on the face data.

Step 306. The traffic management system 104 transmits the withholding agreement code and journey data to the third-party payment system 106 by using the quick response code payment link. The journey data is jointly determined by the quick response code-scanning entry passing operation and the face-scanning exit passing operation, and can be obtained by the exit gate 102 and transmitted to the traffic management system 104.

Step 308. The third-party payment system 106 initiates a fee deduction instruction to the user based on the withholding agreement code for fee deduction.

Step 310. The third-party payment system 106 synchronizes a fee deduction result to the traffic management system 104, and the traffic management system 104 synchronizes the fee deduction result to the exit gate 102.

Step 312. The exit gate 102 displays the fee deduction result and is successfully opened for passing. At this time, the user exits through the gate.

It can be seen that, on a basis that an entry passing operation determines a payment link, payment feature data generated by exit payment operations of different operation types can be transmitted by using the payment link determined by the entry passing operation, so as to implement interworking of different payment operations by using the payment link.

Further, in response to a fee deduction failure in the third-party payment system 106, the following steps are performed:

Step 314. The exit gate 102 recognizes quick response code data based on a quick response code-scanning passing operation. The quick response code data includes a quick response code value and journey data. The journey data is jointly determined by the quick response code-scanning entry passing operation and the face-scanning exit passing operation.

Step 316. The exit gate 102 transmits the quick response code data to the traffic management system 104 by using the quick response code payment link. Step 318. The traffic management system 104 identifies the quick response code data as fee deduction information, and transmits the quick response code data to the third-party payment system 106 by using the quick response code payment link.

Step 320. The third-party payment system 106 initiates a fee deduction instruction to the user based on the quick response code data for fee deduction.

Step 322. The third-party payment system 106 synchronizes a fee deduction result to the traffic management system 104, and the traffic management system 104 synchronizes the fee deduction result to the exit gate 102.

Step 324. The exit gate 102 displays the fee deduction result and is successfully opened. At this time, the user exits through the gate.

Certainly, in response to that the fee deduction fails again, quick response code-scanning can be performed again for fee deduction and exit, and details are omitted herein for simplicity.

The above is an implementation in which quick response code-scanning entry and face-scanning exit are used. In practice, face-scanning entry and quick response code-scanning exit can be used, and a user can perform selection based on a specific demand. It can be seen that, after fee deduction of exit payment operations of different operation types fails, an exit payment operation of a same type can be used for fee deduction and passing, thereby improving fee deduction efficiency and passing efficiency.

Based on a same inventive concept, the implementations provide a traffic management system 104. For same or similar parts of the implementations, mutual references can be made to the implementations. Each implementation focuses on a difference from other implementations.

Figure 4:
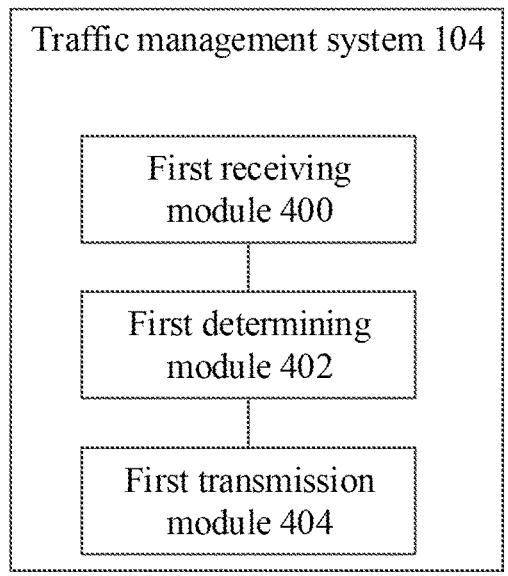
FIG. 4 is a schematic diagram illustrating a traffic management system according to an implementation of the present specification.

References can be made to FIG. 4, a traffic management system 104 is disclosed, including: a first receiving module 400, configured to receive, by using a payment link corresponding to an entry passing operation, related data generated by a first exit payment operation, the entry passing operation and the first exit payment operation forming a same journey and corresponding to different types of payment operations; a first determining module 402, configured to determine fee deduction information corresponding to the first exit payment operation based on the related data of the first exit payment operation; and a first transmission module 404, configured to transmit, by using the payment link, the fee deduction information corresponding to the first exit payment operation to a third-party payment system 106 for exit fee deduction.

In an implementation, the first exit payment operation is a biometric feature recognition operation and the entry passing operation is a quick response code recognition operation.

The system further includes: a second determining module, configured to determine a quick response code payment link as the payment link based on the quick response code recognition operation.

The first receiving module 400 is, for example, configured to receive, by using the quick response code payment link, biometric feature data generated by the biometric feature recognition operation.

In an implementation, the first determining module 402 is, for example, configured to: determine user fee deduction account information based on the related data of the first exit payment operation; and determine withholding agreement code corresponding to the first exit payment operation based on the user fee deduction account information.

In an implementation, the first exit payment operation is a quick response code recognition operation and the entry passing operation is a biometric feature recognition operation.

The system further includes: a third determining module, configured to determine a biometric feature payment link as the payment link based on the biometric feature recognition operation.

The first receiving module 400 is, for example, configured to receive, by using the biometric feature payment link, quick response code data generated by the quick response code recognition operation.

In an implementation, the system further includes: a second receiving module, configured to: in response to a fee deduction failure, receive, by using the payment link, related data generated by a second exit payment operation, the entry passing operation and the second exit payment operation corresponding to a same type of payment operation; a fourth determining module, configured to determine fee deduction information corresponding to the second exit payment operation based on the related data of the second exit payment operation; and a second transmission module, configured to transmit, by using the payment link, the fee deduction information corresponding to the second exit payment operation to the third-party payment system 106 for exit fee deduction.

Based on a same inventive concept, the implementations provide a third-party payment system 106. For same or similar parts of the implementations, mutual references can be made to the implementations. Each implementation focuses on a difference from other implementations.

Figure 5:
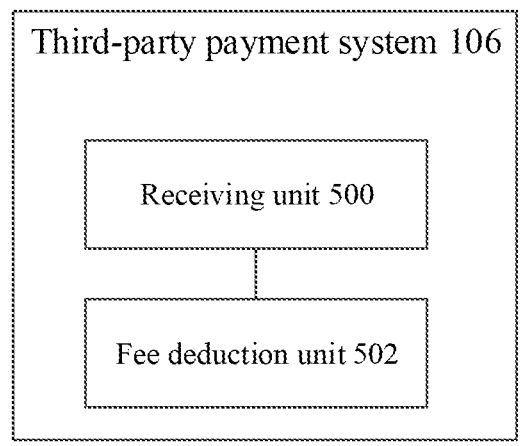
FIG. 5 is a schematic diagram illustrating a third-party payment system according to an implementation of the present specification.

References can be made to FIG. 5, a third-party payment system 106 is disclosed, including: a receiving unit 500, configured to receive fee deduction information corresponding to a first exit payment operation by using a payment link corresponding to an entry passing operation, the entry passing operation and the first exit payment operation forming a same journey and corresponding to different types of payment operations, and after a traffic management system 104 receives, by using the payment link, related data generated by the first exit payment operation, the fee deduction information corresponding to the first exit payment operation being determined based on the related data; and a fee deduction unit 502, configured to perform fee deduction based on the fee deduction information corresponding to the first exit payment operation.

In an implementation, the fee deduction unit 502 is further configured to: in response to a fee deduction failure, perform fee deduction by receiving fee deduction information corresponding to a second exit payment operation by using the payment link, the entry passing operation and the second exit payment operation correspond to a same type of payment operation, and after the traffic management system 104 receives, by using the payment link, related data generated by the second exit payment operation, the fee deduction information corresponding to the second exit payment operation is determined based on the related data of the second exit payment operation.

Based on a same inventive concept, the implementations provide a system for implementing interworking of different payment operations. For same or similar parts of the implementations, mutual references can be made to the implementations. Each implementation focuses on a difference from other implementations.

References can be made to FIG. 1, the implementations discloses a system for implementing interworking of different payment operations, including: an entry gate 100, an exit gate 102, a traffic management system 104, and a third-party payment system 106.

The entry gate 100 is configured to collect data generated by entry.

The exit gate 102 is configured to obtain related data generated by a first exit payment operation.

The traffic management system 104 is configured to: receive, by using a payment link corresponding to an entry passing operation, the related data generated by the first exit payment operation; determine fee deduction information corresponding to the first exit payment operation based on the related data of the first exit payment operation; and transmit, by using the payment link, the fee deduction information corresponding to the first exit payment operation to the third-party payment system 106, the entry passing operation and the first exit payment operation forming a same journey and corresponding to different types of payment operations.

The third-party payment system 106 is configured to perform a fee deduction operation based on the fee deduction information corresponding to the first exit payment operation.

In an implementation, the traffic management system 104 is configured to: in response to a fee deduction failure, receive, by using the payment link, related data generated by a second exit payment operation, the entry passing operation and the second exit payment operation corresponding to a same type of payment operation; determine fee deduction information corresponding to the second exit payment operation based on the related data of the second exit payment operation; and transmit the fee deduction information corresponding to the second exit payment operation to the third-party payment system 106 by using the payment link.

The third-party payment system 106 is configured to perform a fee deduction operation based on the fee deduction information corresponding to the second exit payment operation.

The implementations in the present specification are described in a progressive way. For same or similar parts of the implementations, mutual references can be made to the implementations. Each implementation focuses on a difference from other implementations. In particular, system implementations are basically similar to method implementations, and therefore are described briefly. For related parts, references can be made to related descriptions in the method implementations.

Based on a same inventive concept as in the above implementations, an implementation of the present specification further provides a computer-readable storage medium storing a computer program. The steps of any above method are implemented when the program is executed by a processor.

Figure 6:
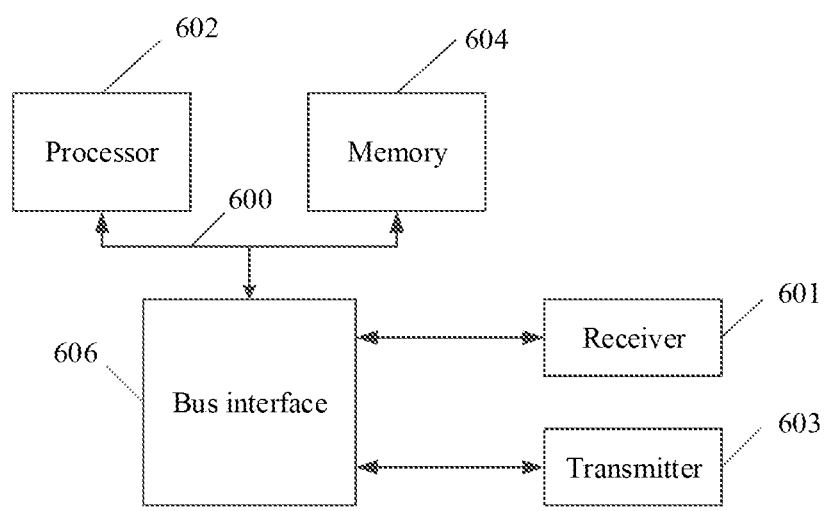
FIG. 6 is a schematic diagram illustrating an electronic device according to an implementation of the present specification.

Based on a same inventive concept as in the above implementations, an implementation of the present specification further provides a computer device, as shown in FIG. 6, including a memory 604, a processor 602, and a computer program stored in the memory 604 and executable on the processor 602, where the steps of any above method are implemented when the processor 602 executes the program.

In FIG. 6, a bus architecture (represented by a bus 600) is provided. The bus 600 can include an arbitrary number of interconnected buses and a bridge. The bus 600 links various circuits including one or more processors represented by the processor 602 and a memory represented by the memory 604. The bus 600 can further link various other circuits, such as a peripheral device, a voltage stabilizer, and a voltage management circuit, which are well known in the art. Therefore, details are omitted in the present specification. A bus interface 606 provides an interface between the bus 600 and a receiver 601 and a transmitter 603. The receiver 601 and the transmitter 603 can be a same element, i.e., a transceiver, and provide a unit for communicating with various other terminal devices on a transmission medium. The processor 602 is responsible for managing the bus 600 and general processing, and the memory 604 can be configured to store data used by the processor 302 when the processor 302 performs an operation.

The algorithms and the displays provided herein are not inherently related to any particular computer, virtual system, or another device. Various general-purpose systems can also be used with the teachings based herein. The structure required to construct such a system will be apparent from the above description. In addition, the present specification is not directed to any particular programming language. It should be understood that the content of the present specification described herein can be implemented in various programming languages, and that the above description of a particular language is intended to disclose implementations of the present specification.

In the specification provided herein, numerous specific details are set forth. However, it can be understood that the implementations of the present specification can be practiced without these specific details. In some examples, well-known methods, structures, and techniques have not been shown in detail so as not to obscure the understanding of the present specification.

Similarly, it should be understood that, to streamline the present disclosure and to facilitate an understanding of one or more of the various inventive aspects, in the above description of exemplary implementations of the present specification, the various features of the present specification are sometimes grouped together into individual implementations, figures, or descriptions thereof. However, the disclosed method should not be construed as reflecting an intention that the present claimed specification requires more features than those expressly recited in each claim. Rather, as reflected in the following claims, aspects of the disclosure lie in less than all features of the single implementation previously disclosed. Accordingly, the claims following the implementations are hereby expressly incorporated by references into the implementations, and each claim is intended as a separate implementation of the present specification.

A person skilled in the art can understand that the modules in the devices in the implementations can be adaptively changed and arranged in one or more devices different from the implementations. The modules or units or components in the implementations can be combined into one module or unit or component, and in addition, they can be divided into a plurality of sub-modules or sub-units or sub-components. Except that at least some of such features and/or processes or units are mutually exclusive, any combination of all features disclosed in the present specification (including the accompanying claims, abstract, and drawings) and all processes or units of any method or device so disclosed can be used. Unless expressly stated otherwise, each feature disclosed in the present specification (including the accompanying claims, abstract, and drawings) can be replaced by alternative or additional features that provide the same, equivalent, or similar purpose.

Furthermore, a person skilled in the art can understand that while some implementations herein include certain features included in other implementations rather than other features, combinations of features of different implementations are meant to be within the scope of the present specification and form different implementations. For example, in the following claims, any of the claimed implementations can be used in any combination.

The various component implementations of the present specification can be implemented by using hardware, software modules running on one or more processors, or combinations thereof. A person skilled in the art should understand that a microprocessor or digital signal processor (DSP) can be used in practice to implement some or all of the functions of some or all of the components of the gateway, proxy server, and system according to implementations of the present specification. The present specification can further be implemented as a part or all of a device or apparatus program (e.g., a computer program and a computer program product) for performing the methods described herein. Such programs implementing the present specification can be stored on a computer-readable medium, or can be in the form of one or more signals. Such signals can be downloaded from an Internet web site, provided on carrier signals, or provided in any other form.

It should be noted that the above implementations illustrate rather than limit the present specification, and that a person skilled in the art can design alternative implementations without departing from the scope of the appended claims. In the claims, any reference signs placed between parentheses shall not be construed as limiting the claim. The word "comprise" does not exclude the presence of elements or steps not listed in the claims. The word "one" or "one piece of" before an element does not exclude the presence of a plurality of such elements. The present specification can be implemented by using hardware including different elements and by using a suitably programmed computer. In the unit claims enumerating apparatuses, one of these apparatuses can be specifically embodied by a same hardware item. The use of the words first, second, third, and the like does not denote any order. These words can be interpreted as names.

The various embodiments described above can be combined to provide further embodiments. Aspects of the embodiments can be modified, if necessary, to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for implementing interworking of different payment operations, comprising:
    receiving, by using a payment link corresponding to an entry passing operation of a quick response code recognition operation, biometric feature data generated by a first exit payment operation of a biometric feature recognition operation, the entry passing operation and the first exit payment operation corresponding to a same transportation journey of a user and corresponding to different types of payment operations having different payment links and data interfaces, the data generated by the first exit payment operation including identification information of the user detected in the first exit payment operation;
    determining fee deduction information corresponding to the first exit payment operation based on the biometric feature data of the first exit payment operation by converting the identification information in the biometric feature data of the first exit payment operation into a code corresponding to a user fee deduction account of the user; and
    transmitting, by using the payment link corresponding to the entry passing operation, the fee deduction information corresponding to the first exit payment operation to a third-party payment system for exit fee deduction.

2. The method according to claim 1, wherein the determining the fee deduction information corresponding to the first exit payment operation based on the biometric feature data of the first exit payment operation includes:
    determining the user fee deduction account information based on the identification information in the biometric feature data of the first exit payment operation; and
    determining withholding agreement code corresponding to the first exit payment operation based on the user fee deduction account information as the code.

3. The method according to claim 1, comprising:
    in response to a fee deduction failure after the transmitting, by using the payment link, the fee deduction information corresponding to the first exit payment operation to the third-party payment system for the exit fee deduction,
    receiving, by using the payment link, data generated by a second exit payment operation, the entry passing operation and the second exit payment operation corresponding to the same transportation journey and corresponding to a same type of payment operation;
    determining fee deduction information corresponding to the second exit payment operation based on the data of the second exit payment operation; and
    transmitting, by using the payment link, the fee deduction information corresponding to the second exit payment operation to the third-party payment system for the exit fee deduction.

4. A The method according to claim 1, comprising:
    receiving, from a traffic management system, fee deduction information corresponding to a first exit payment operation by using a payment link corresponding to an entry passing operation, the entry passing operation and the first exit payment operation corresponding to a same transportation journey of a user and corresponding to different types of payment operations, wherein the fee deduction information corresponding to the first exit payment operation is generated by the traffic management system by converting identification information of the user detected by the first exit payment operation into a code corresponding to a user fee deduction account of the user; and
    performing fee deduction based on the fee deduction information corresponding to the first exit payment operation.

5. The method according to claim 4, comprising:
    in response to a fee deduction failure after the performing the fee deduction based on the fee deduction information corresponding to the first exit payment operation, performing fee deduction by receiving fee deduction information corresponding to a second exit payment operation by using the payment link, the entry passing operation and the second exit payment operation corresponding to a same type of payment operation, wherein the fee deduction information corresponding to the second exit payment operation is determined based on data generated by the second exit payment operation and received by using the payment link.

6. A computer device, comprising a processor and a memory storing executable instructions, the executable instructions, when executed by the processor, enable the processor to implement acts including:

receiving, by using a payment link corresponding to an entry passing operation of a biometric feature recognition operation, quick response code data generated by a first exit payment operation of a quick response code recognition operation, the entry passing operation and the first exit payment operation corresponding to a same transportation journey of a user and corresponding to different types of payment operations having different payment links and data interfaces, the data generated by the first exit payment operation including identification information of the user detected in the first exit payment operation;

determining fee deduction information corresponding to the first exit payment operation based on the quick response code data of the first exit payment operation by converting the identification information in the quick response code data of the first exit payment operation into a code corresponding to a user fee deduction account of the user; and transmitting, by using the payment link corresponding to the entry passing operation, the fee deduction information corresponding to the first exit payment operation to a third-party payment system for exit fee deduction.

7. The device according to claim 6, wherein the determining the fee deduction information corresponding to the first exit payment operation based on the quick response code data of the first exit payment operation includes:

determining the user fee deduction account information based on the identification information in the quick response code data of the first exit payment operation; and determining withholding agreement code corresponding to the first exit payment operation based on the user fee deduction account information as the code.

8. The device according to claim 6, wherein the acts include:

in response to a fee deduction failure after the transmitting, by using the payment link, the fee deduction information corresponding to the first exit payment operation to the third-party payment system for the exit fee deduction, receiving, by using the payment link, data generated by a second exit payment operation, the entry passing operation and the second exit payment operation corresponding to the same transportation journey and corresponding to a same type of payment operation;

determining fee deduction information corresponding to the second exit payment operation based on the data of the second exit payment operation; and transmitting, by using the payment link, the fee deduction information corresponding to the second exit payment operation to the third-party payment system for the exit fee deduction.

9. The device of claim 6, wherein the acts include:

receiving fee deduction information corresponding to the first exit payment operation by using the payment link corresponding to the entry passing operation; and performing fee deduction based on the fee deduction information corresponding to the first exit payment operation.

10. A non-transitory storage medium having executable instructions stored thereon, the executable instructions, when executed by a processor, enabling the processor to implement acts including:

receiving, by using a payment link corresponding to an entry passing operation of a quick response code recognition operation, biometric feature data generated by a first exit payment operation a biometric feature recognition operation, the entry passing operation and the first exit payment operation corresponding to a same transportation journey of a user and corresponding to different types of payment operations having different payment links and data interfaces, the data generated by the first exit payment operation including identification information of the user detected in the first exit payment operation;

determining fee deduction information corresponding to the first exit payment operation based on the biometric feature data of the first exit payment operation by converting the identification information in the biometric feature data of the first exit payment operation into a code corresponding to a user fee deduction account of the user; and transmitting, by using the payment link corresponding to the entry passing operation, the fee deduction information corresponding to the first exit payment operation to a third-party payment system for exit fee deduction.

11. The storage medium according to claim 10, wherein the acts include in response to a fee deduction failure after the transmitting, by using the payment link, the fee deduction information corresponding to the first exit payment operation to the third-party payment system for the exit fee deduction, determining a biometric feature payment link as another payment link based on the biometric feature recognition operation; and receiving, by using the biometric feature payment link, quick response code data generated by the quick response code recognition operation.

12. The storage medium according to claim 10, wherein the determining the fee deduction information corresponding to the first exit payment operation based on the biometric feature data of the first exit payment operation includes:

determining the user fee deduction account information based on the identification information in the biometric feature data of the first exit payment operation; and determining withholding agreement code corresponding to the first exit payment operation based on the user fee deduction account information as the code.

13. The storage medium according to claim 10, wherein the acts include:

in response to a fee deduction failure after the transmitting, by using the payment link, the fee deduction information corresponding to the first exit payment operation to the third-party payment system for the exit fee deduction, receiving, by using the payment link, data generated by a second exit payment operation, the entry passing operation and the second exit payment operation corresponding to the same transportation journey and corresponding to a same type of payment operation;

determining fee deduction information corresponding to the second exit payment operation based on the data of the second exit payment operation; and transmitting, by using the payment link, the fee deduction information corresponding to the second exit payment operation to the third-party payment system for the exit fee deduction.

14. A method, comprising:

receiving, by using a payment link corresponding to an entry passing operation of a biometric feature recognition operation, quick response code data generated by a first exit payment operation of a quick response code recognition operation, the entry passing operation and the first exit payment operation corresponding to a same transportation journey of a user and corresponding to different types of payment operations having different payment links and data interfaces, the data generated by the first exit payment operation including identification information of the user detected in the first exit payment operation;

determining fee deduction information corresponding to the first exit payment operation based on the quick response code data of the first exit payment operation by converting the identification information in the quick response code data of the first exit payment operation into a code corresponding to a user fee deduction account of the user; and transmitting, by using the payment link corresponding to the entry passing operation, the fee deduction information corresponding to the first exit payment operation to a third-party payment system for exit fee deduction.

15. The method according to claim 14, wherein the determining the fee deduction information corresponding to the first exit payment operation based on the quick response code data of the first exit payment operation includes:

determining the user fee deduction account information based on the identification information in the quick response code data of the first exit payment operation; and determining withholding agreement code corresponding to the first exit payment operation based on the user fee deduction account information as the code.

16. The method according to claim 14, comprising:

in response to a fee deduction failure after the transmitting, by using the payment link, the fee deduction information corresponding to the first exit payment operation to the third-party payment system for the exit fee deduction, receiving, by using the payment link, data generated by a second exit payment operation, the entry passing operation and the second exit payment operation corresponding to the same transportation journey and corresponding to a same type of payment operation;

determining fee deduction information corresponding to the second exit payment operation based on the data of the second exit payment operation; and transmitting, by using the payment link, the fee deduction information corresponding to the second exit payment operation to the third-party payment system for the exit fee deduction.

17. The method according to claim 14, comprising:

receiving, from a traffic management system, fee deduction information corresponding to a first exit payment operation by using a payment link corresponding to an entry passing operation, the entry passing operation and the first exit payment operation corresponding to a same transportation journey of a user and corresponding to different types of payment operations, wherein the fee deduction information corresponding to the first exit payment operation is generated by the traffic management system by converting identification information of the user detected by the first exit payment operation into a code corresponding to a user fee deduction account of the user; and performing fee deduction based on the fee deduction information corresponding to the first exit payment operation.

18. The method according to claim 17, comprising:

in response to a fee deduction failure after the performing the fee deduction based on the fee deduction information corresponding to the first exit payment operation, performing fee deduction by receiving fee deduction information corresponding to a second exit payment operation by using the payment link, the entry passing operation and the second exit payment operation corresponding to a same type of payment operation, wherein the fee deduction information corresponding to the second exit payment operation is determined based on data generated by the second exit payment operation and received by using the payment link.

* * * * *